United States Patent [19]

Eisenhaure et al.

[11] Patent Number: 4,723,735
[45] Date of Patent: Feb. 9, 1988

[54] ENERGY STORAGE ATTITUDE CONTROL AND REFERENCE SYSTEM

[75] Inventors: David B. Eisenhaure, Hull; James R. Downer, Cambridge; Tim E. Bliamptis, Lexington; George A. Oberbeck, East Walpole, all of Mass.; Susan D. Hendrie, Chicago, Ill.

[73] Assignee: The Charles Stark Draper Laboratory, Inc., Cambridge, Mass.

[21] Appl. No.: 687,068

[22] Filed: Dec. 28, 1984

[51] Int. Cl.⁴ ............................................. B64G 1/28
[52] U.S. Cl. ...................................... 244/165; 322/4; 310/90.5
[58] Field of Search ................. 244/164, 165; 322/4, 322/16, 38, 39; 308/10; 310/74, 94, 95, 102 R, 113

[56] References Cited

U.S. PATENT DOCUMENTS

| | | | |
|---|---|---|---|
| 3,158,750 | 11/1964 | Roes | 322/4 |
| 3,591,108 | 7/1971 | Perkel | 244/165 |
| 4,164,018 | 8/1979 | Legrand | 310/113 |
| 4,179,729 | 12/1979 | Stanton et al. | 322/4 |
| 4,211,452 | 7/1980 | Poubeau | 244/165 |
| 4,483,570 | 11/1984 | Inoue | 244/158 R |

FOREIGN PATENT DOCUMENTS 2823910 12/1978 Fed. Rep. of Germany ...... 244/165
2,423,808 12/1979 France ................. 244/165
2081991 2/1982 United Kingdom .............. 322/4

OTHER PUBLICATIONS

Poubeau, "Satellite Flywheels with Magnetic Bearings and Passive Radial Centering", Journal of Spacecraft, vol. 17, Nos. 2, 3,4/1980.

Primary Examiner—Galen Barefoot
Attorney, Agent, or Firm—Joseph S. Iandiorio; Douglas E. Denninger

[57] ABSTRACT

An energy storage attitude control and reference system for a craft including at least two flywheels with their angular momenta balanced to produce zero net angular momentum and at least two motor/generator units each including one of the flywheels in its rotor structure. The system further includes one pair of bearings for supporting each of the flywheels, means for measuring the position of each flywheel relative to its bearings, means for resolving current to and from said motor/generator units, means for applying torques to each flywheel through its respective bearings for controlling attitude of the craft about two mutually perpendicular axes, and means for exerting torques to each flywheel through its respective motor/generator to provide attitude control of the craft about a third axis perpendicular to the first two and for controlling the energy storage level of the flywheels.

33 Claims, 20 Drawing Figures

ENERGY STORAGE ATTITUDE CONTROL AND REFERENCE SYSTEM

FIELD OF INVENTION

This invention relates to attitude control and attitude reference of a craft and energy storage for the craft, and more particularly to a combined attitude control, attitude reference, and energy storage system utilizing flywheels.

BACKGROUND OF INVENTION

Most independent craft that orbits the earth contain attitude control, attitude reference, and energy storage systems. Efficient attitude control, attitude reference, and energy storage systems are especially important for satellites, where weight, longevity, and accuracy are crucial considerations. Existing satellites utilize separate subsystems to perform attitude control, provide attitude reference, and store energy. Attitude control is typically provided by reaction or momentum wheels, while attitude reference is provided by inertial sensors and devices that provide an absolute reference such as sun sensors or star trackers. Energy storage is typically performed by batteries.

Satellite attitude can be controlled by applying torques through reaction wheels or control moment gyros. Typically, accuracy is compromised because conventional ball and gas bearings are unable to precisely maintain the orientation of the wheel's angular momentum with respect to the satellite. Inertial sensors used for attitude reference consist of single and two degree of freedom gyros which are also typically supported by ball or gas bearings. Either suspension has a rate life that is shorter than a typical satellite mission, thus requiring redundancy, and therefore added weight, of these systems.

Power is typically supplied to a satellite through photovoltaic arrays. An energy storage system is therefore essential to provide power during the periods when the arrays cannot supply power and to provide additional power for peak loads. Batteries provide electrochemical storage. Older satellite designs incorporate nickel-cadmium batteries, while newer designs use nickel-hydrogen batteries having improved energy density and life. Both battery types, however, are still relatively heavy and gradually lose storage capability over time. Flywheels do not degrade over time and therefore maintain their full energy storage capacity throughout their life. However, their weight must be added to that of additional systems required for attitude reference and attitude control.

SUMMARY OF INVENTION

It is therefore an object of this invention to provide a combined attitude, reference and energy storage system.

It is a further object of this invention to provide an improved attitude control system for a spacecraft.

It is a further object of this invention to provide such a control system using pairs of suspended flywheels.

It is a further object of this invention to provide such a control system providing control about one axis of the craft, typically the roll axis, by differentially torquing motor/generators.

It is a further object of this invention to provide such a control system providing control about two other axes, typically the pitch and yaw axes, by tilting the flywheels within their bearings at a controlled rate.

It is a further object of this invention to provide an improved attitude control system having at least two pairs of flywheels which provide control about three axes by tilting the flywheels within their bearings.

It is a further object of this invention to provide an improved attitude reference system for a spacecraft.

It is a further object of this invention to provide such a reference system using pairs of suspended flywheels.

It is a further object of this invention to provide such a reference system in spite of variations in both magnitude and direction of angular momentum within the system.

It is a further object of this invention to provide such a reference system which determines reference about the pitch and yaw axes from bearing torque and rotor position information.

It is a further object of this invention to provide an improved energy storage system for a spacecraft.

It is a further object of this invention to provide such an energy storage system using the flywheel's inertia to store and the motor/generator to transfer energy as well as to permit attitude control and reference.

It is a further object of this invention to provide such a system using suspended flywheels.

The invention may be accomplished by at least two flywheels with their angular momenta balanced to produce zero net angular momentum, at least two motor/generator units each including one of the flywheels in its rotor structure, and a pair of bearings for supporting each of the flywheels. The invention further includes means for measuring the position of each flywheel relative to its bearings, means for resolving current to and from the motor/generator units, means for applying torque to each flywheel through its respective bearings for controlling attitude of the craft about two mutually perpendicular axes, and means for exerting torques on each of the flywheels through its respective motor/generator to provide attitude control of the craft about a third axis perpendicular to the first two and for controlling the energy storage level of the flywheels.

In one embodiment, the means for measuring indicates the orientation of each flywheel and includes a tachometer which indicates the spin rate of each flywheel. The means for applying torques determines angular momentum of each flywheel from the spin rate and orientation indications. The means for applying torques matches desired attitude with actual attitude to resolve attitude error and utilizes attitude error and angular momentum to command a change in flywheel orientation relative to the bearings. The utilization of the attitude error and angular momentum may be integrated over time. The means for applying torques may then utilize attitude error and angular momentum to command spin rate acceleration for each flywheel.

In a preferred embodiment, the means for exerting torques includes a power conditioning circuit which drives the motor/generator in response to the acceleration command. The power conditioning circuit includes a pulse width modulated bidirectional inverter interconnecting the motor/generator with a power supply bus and a summing circuit for determining differences between a reference voltage and the voltage on the power supply bus. The power conditioning circuit further includes a pulse width modulator switch control response to the summing circuit, to the means for measuring, and to the means for resolving for actuating the inverter to increase pulse width as a function of increase in the difference between the reference voltage and the voltage in the bus. The switch control also actuates the inverter to increase current to the motor/generator in the motor direction when the bus voltage exceeds the reference voltage and to increase current from the motor/generator in the generator direction when the reference voltage exceeds the bus voltage. The power conditioning circuit thereby controls motor/generator tourque to effect energy storage, attitude control, or both. The means for measuring may include, for each motor/generator unit, a pole sensor which develops a commutating signal for switching current flow to and from the motor/generator unit.

In a preferred embodiment, the means for measuring includes a capacitive sensor which includes printed circuit areas located on the housing of each motor/generator unit, wherein the printed circuit areas produce an electric field that is affected by motion of the rotor. The capacitive sensor may produce two electric fields which aid in monitoring axial motion of the rotor and one electric field which serves to monitor radial motion of the rotor.

In one embodiment, the system further includes a single degree of freedom gyroscope which senses rotation of the craft about an axis. The means for measuring provides attitude reference about the pitch and yaw axes of the craft, and the gyroscope provides attitude reference about the roll axis of the craft. The bearings are magnetic bearings, the flywheels produce zero net angular momentum at the same spin rate, the motor/generator has three phases, and the means for resolving resolves current in each phase.

The invention also encompasses an energy storage, attitude control and reference system for a craft including at least two pairs of flywheels with the angular momenta of each pair balanced to produce zero net angular momentum, and at least four motor/generator units each including one of the flywheels in its rotor structure. This embodiment also includes a pair of bearings for supporting each of the flywheels, means for measuring, means for applying torques for controlling attitude about three axes, and means for maintaining at zero the net torque exerted by the motor/generators on the craft.

In a preferred embodiment, the net spin axes of the flywheel pairs are mutually perpendicular. The means for measuring and the means for applying torques function similarly as above. The means for maintaining includes components similar to the means for exerting as mentioned above. The bearings are magnetic bearings, the flywheels produce zero net angular momentum at the same spin rate, the motor/generators have three phases, and the means for resolving resolves current in each phase.

DISCLOSURE OF PREFERRED EMBODIMENT

Other objects, features and advantages will occur from the following description of a preferred embodiment and the accompanying drawings, in which.

Figure 1:
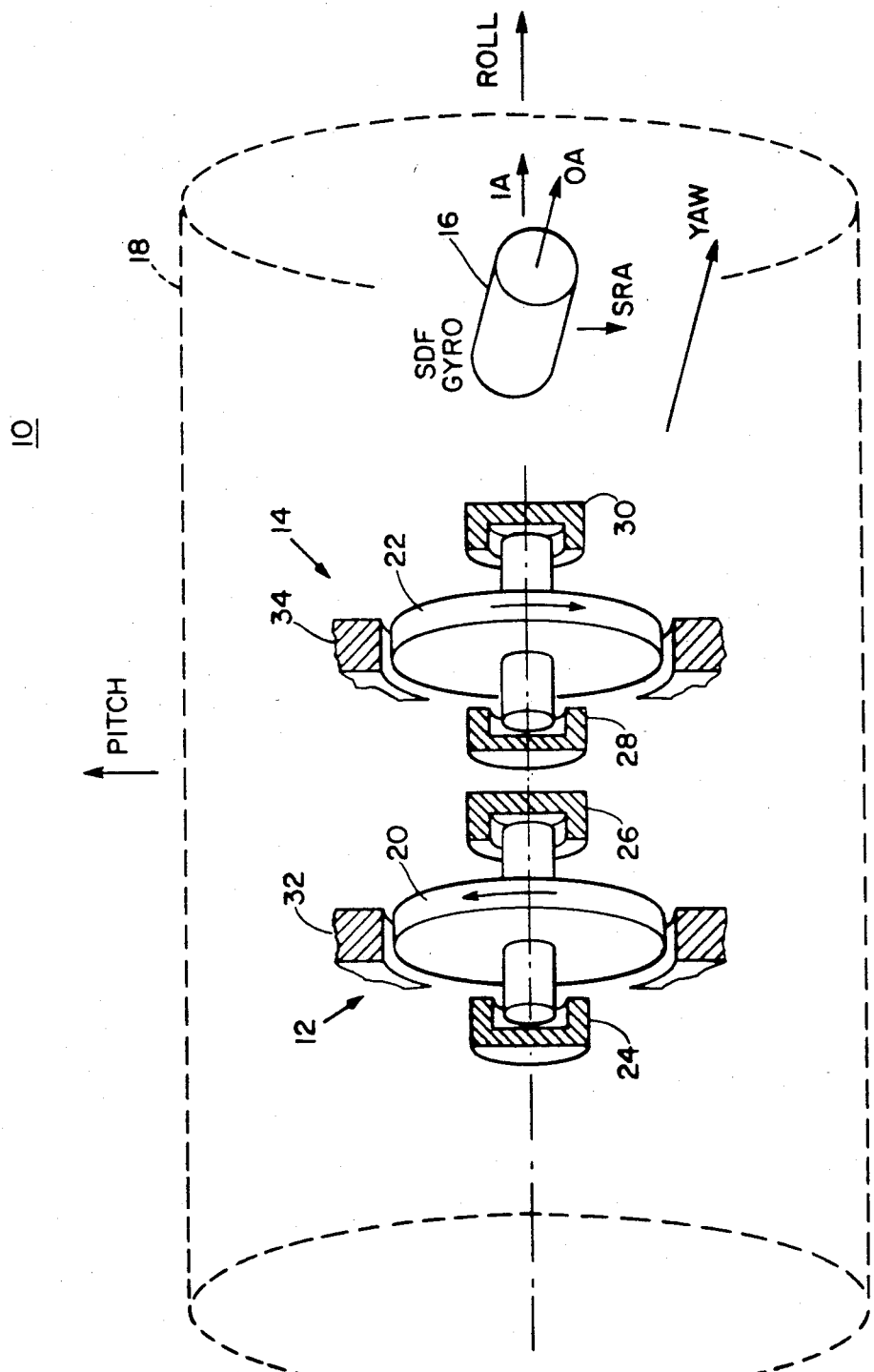
FIG. 1 is a schematic elevational view of one embodiment of the present invention.

System 10 according to this invention is shown schematically in FIG. 1, including two flywheel systems 12, 14 and a single degree of freedom gyroscope 16 housed in a vehicle such as a satellite 18. Each flywheel system includes flywheels 20, 22, which rotate about their spin axes in opposite directions and are mounted along their spin axes by bearings 24, 26 and 28, 30. Attached to each flywheel 20, 22 is motor/generator 32, 34. Flywheels 20, 22 are shown in FIG. 1 as sharing a common spin axis. This orientation is not required as long as the angular momentum of the flywheels can be balanced to produce zero net angular momentum. For convenience of angular momentum control, it is desirable that inertia be the same for both flywheels such that zero net angular momentum is achieved when the spin rates of the flywheels are the same and the flywheels are centered within their bearings. The balanced condition is known as nominal alignment.

Flywheels 20 and 22 perform three functions. First, they store energy obtained typically from a photovoltaic array during sunlight periods and provide the stored energy as current to the load on demand. Second, they control attitude: flywheels 20, 22, may be torqued through their bearings 24, 26 and 28, 30 to provide attitude control in the pitch and the yaw axes. When a differential in torque, resulting in a change in spin rate, is provided for the two flywheels 20, 22 they function as reaction wheels to control attitude about the roll axis. Third, they perform an attitude reference function. The bearings 24, 26 and 28, 30 may be used to sense torques on the flywheels 20, 22 about the pitch and the yaw axes as indications of changes in attitude of the satellite along those axes. Sensing of motion about the roll axis is accomplished by the external single degree of freedom gyro 16 having input axis IA, output axis OA, and spin reference axis SRA.

The common aspect to the three above-mentioned functions is the use of angular momentum. Energy is stored or provided to the craft by changing the angular momentum of the flywheels along their spin axes. The attitude of the craft can be controlled using angular momentum by changing the speeds or orientations of the flywheels. The effect of outside forces on the flywheels can be sensed to detect the rate of attitude change, thus providing attitude reference.

Figure 2:
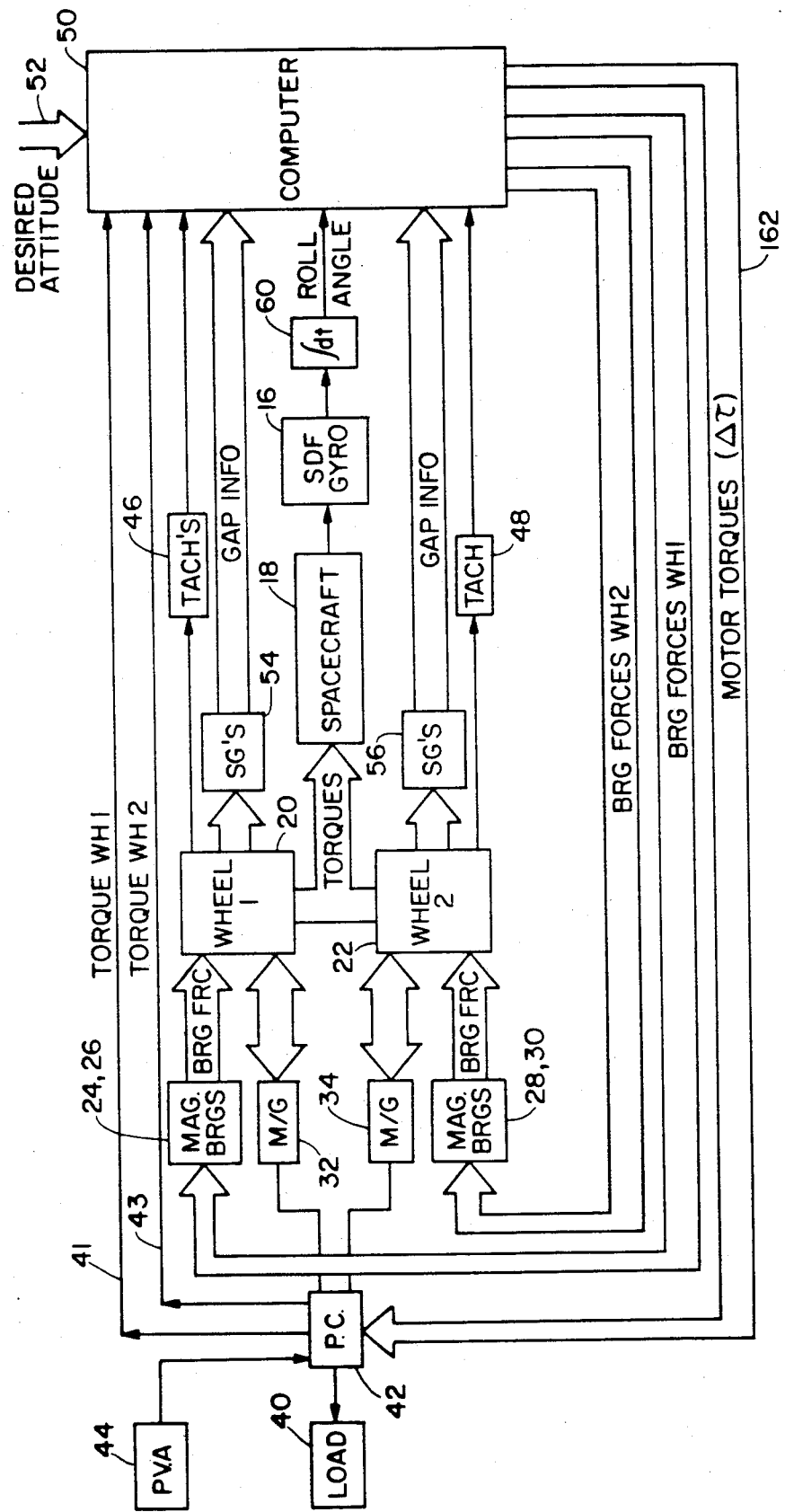
FIG. 2 is a block diagram of the invention.
Figure 14:
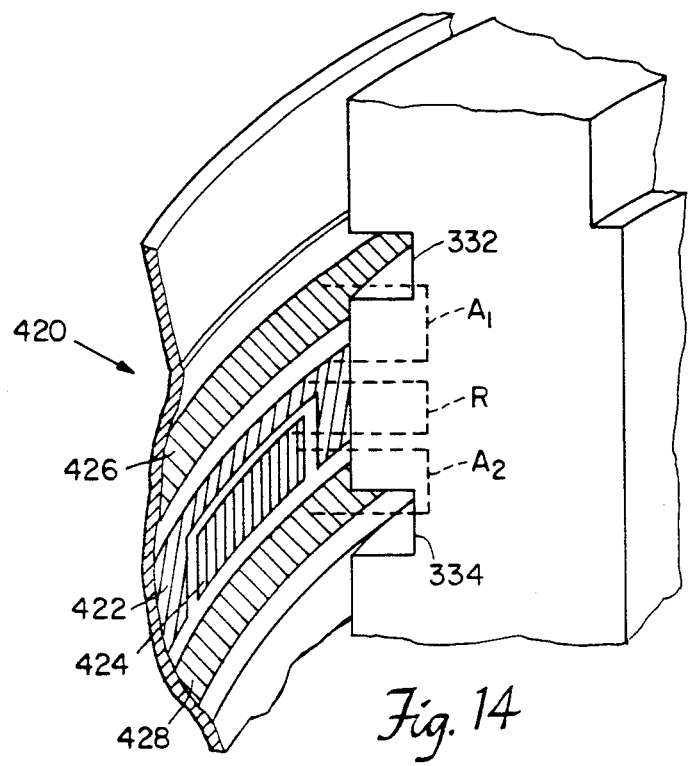
FIG. 14 is a partial, broken-away view of a sensor used to determine the position of the rotor with respect to the housing.

The more complete block diagram of the combined attitude reference and energy storage system is shown in FIG. 2, where the load 40 is interconnected with the motor/generator systems 32, 34 through power conditioning circuits 42. During periods of power availability, such as sunlight hours, energy collected by an unregulated power supply, such as photovoltaic array 44, is directed through power conditioning circuit 42 to drive the motor/generator systems 32 and 34 as motors, providing increased torque to flywheels 20, 22 to store the energy. On demand, when load 40 requires power, power conditioning circuit 42 causes motor/generator systems 32 and 34 to operate as generators, taking the energy stored as momentum in flywheels 20 and 22 and converting it to current to be supplied through power conditioning circuit 42 to load 40. A computer 50, given the desired attitude information at input 52, provides commands to bearings 24, 26 and to bearings 28, 30, all preferably magnetic bearings, to apply the forces resulting in torques on satellite 18 in the yaw and pitch axes. Torque commands, signal 162, are directed to conditioning circuit 42 by computer 50. Signals 41, 43 representing torque of each motor/generator are provided through power conditioning circuit 42. The rotational speeds of each of the wheels 20 and 22 are sensed by tachometers 46 and 48 and provided to computer 50. Similarly, signal generators 54, 56, such as capacitive, inductive or optical sensors, sense the position of the flywheels 20, 22 with respect to the body of the spacecraft and provide that information to computer 50, where it is used to estimate the attitude rate of the satellite. Capacitive sensors of one embodiment are shown in FIG. 14 and described below. The various torques applied by flywheels 20, 22 as depicted in FIG. 2 are applied directly to spacecraft 18 to control its attitude in the yaw, pitch and roll axes. The single degree of freedom rate gyro 16 senses the rate of change of the attitude about the roll axis, which is then integrated over time by integrator circuit 60 and provided as roll angle information to computer 50.

Figure 3:
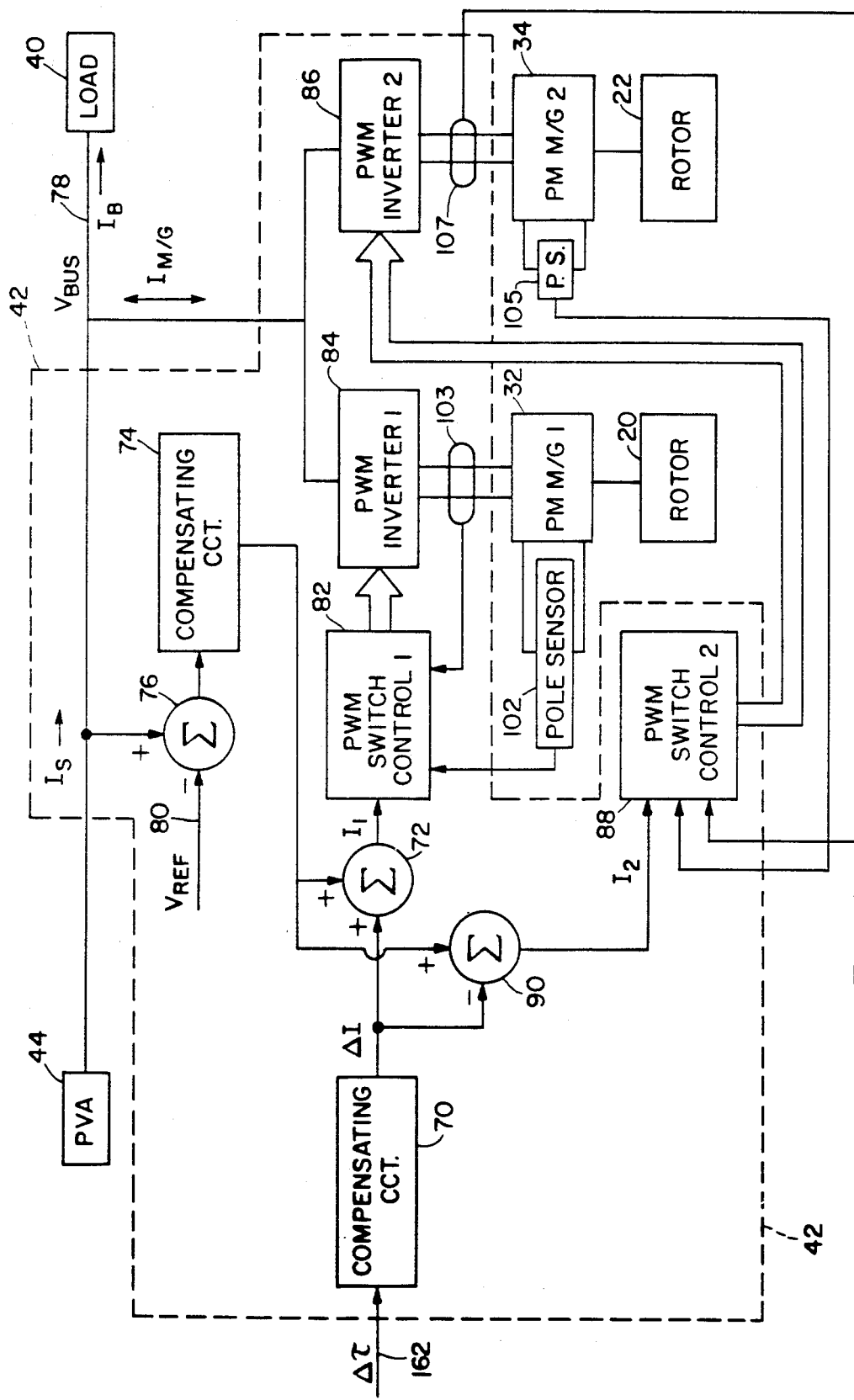
FIG. 3 is a more detailed block diagram of the power conditioning circuit and spin axis control of FIG. 2.

Power conditioning circuit 42, shown in greater detail in FIG. 3, responds to torque commands, signal 162, and errors in bus voltage. Torque commands from computer 50, FIG. 2, are fed to compensating circuit 70, which provides a voltage output representing a current command indicating the desired torque about the spin axis. This current command is fed into one positive input of summing circuit 72. The other positive input of summing circuit 72 is received from compensating circuit 74, which in turn receives its input from summing circuit 76. Compensating circuits 70 and 74 stabilize the system and provide conventional damping, filtering and shaping. Summing circuit 76 provides an output to compensating circuit 74 reflecting the relationship of the voltage of the main power bus 78 and a reference voltage 80.

The current, $I_S$, provided by power source 44 is either added to or subtracted from motor/generator current $I_{M/G}$ to provide the resulting bus current $I_B$ to load 40. Summing circuit 76, which may be implemented by an operational amplifier, receives the reference voltage $V_{REF}$ at its negative input and the bus voltage $V_{BUS}$ at its positive input. Any difference between the two provides an output to compensating circuit 74 which stabilizes the system and provides conventional damping, filtering and shaping. The output of compensating circuit 74 is a command for affecting the magnitude and direction of motor/generator current $I_{M/G}$. A positive difference output from summing circuit 76 and compensating circuit 74 indicates that the bus voltage is higher than the reference voltage, and so the current $I_{M/G}$ is increased in the motor direction to motor/generators 32, 34. When the output of summing circuit 76 is negative that indicates that the bus voltage is lower than the reference voltage and so the motor/generator current $I_{M/G}$ will be decreased in the motor direction or increased in the generator direction depending upon which mode motor/generator 32, 34 is operating in. In this way motor/generator 32, 34 and rotor 20, 22 function not only to store energy during peak power collection times and return it during low power collection times, but also act to regulate the voltage on bus 78. As described below in relation to FIG. 4, the output of switching network 82 is a series of pulses applied in inverter 84. The greater the power input required to the motor or the greater the power output required from the generator, the wider is the pulse provided in inverter 84. Pulse width modulation switch control 82 responds to the commutating signal output from pole sensor 102 and a signal relating to current measurement provided by sensor 103, in order to switch the pulses in inverter 84 at the proper time. It also controls the variation of the width of the pulses in response to the difference voltage at the output of summing circuit 76.

Thus, summing circuit 72 receives current commands representing the torque requirement $\Delta\tau$, signal 162, and commands from compensating circuit 74 representing the current requirement $I_{M/G}$. The total requirement is provided as current $I_1$ to a pulse width modulated switch control 82, which then operates pulse width modulated inverter 84 to drive motor/generator 32 in either the motor or the generator mode to provide the current $I_{M/G}$ in the proper direction and apply the proper torque to rotor 20 to cause the desired attitude change about the roll axis. Pulse width modulated inverter 86 is similarly driven by pulse width modulator switch control 88 to drive motor/generator 34 and rotor 22 in response to current command $I_2$ from summing circuit 90, to the commutation signal from pole sensor 105, and to the current measurement of sensor 107. Sensors 103, 107 also provide signals 41, 43 of FIG. 2, representing wheel torque. Summing circuit 90 operates in the same fashion as summing circuit 72, with the exception that the torque current command is delivered to the negative input of summing circuit 90, while the current command for the current $I_{M/G}$ is fed to the positive input of summing 90. This is done so that while rotor 20 is driven in one direction, rotor 22 is driven in the other in order to unbalance the torques to provide a net torque through the motor/generators.

Figure 4:
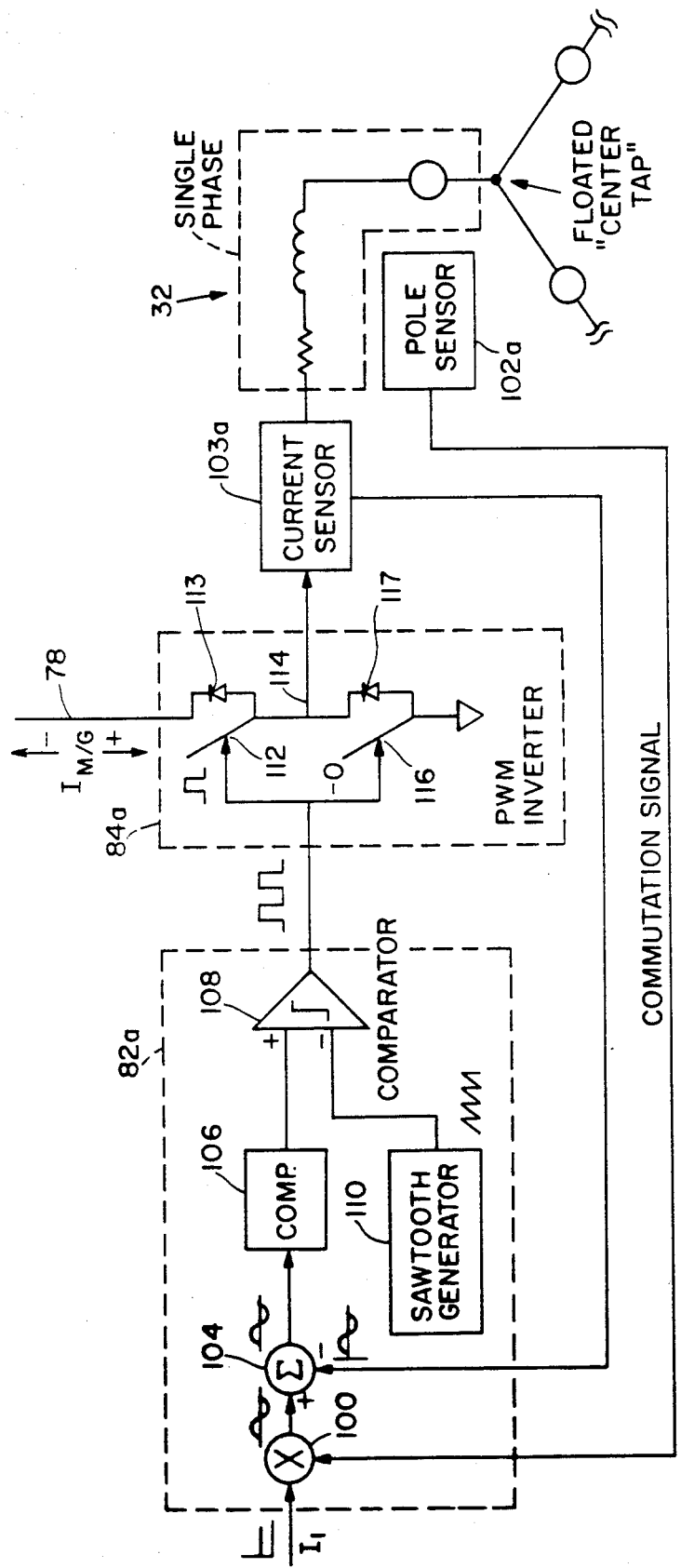
FIG. 4 is a more detailed diagram of the pulse width modulator switch control and the pulse width modulated inverter of FIG. 3.

Pulse width modulator switch controls 82 and 88 and pulse width modulated inverters 84 and 86 each are implemented for three phases, as shown with respect to pulse width modulated switch control single phase circuit 82a and pulse width modulated inverter single phase circuit 84a, FIG. 4. Circuit 82a receives current command $I_1$ in multiplier circuit 100 from summing circuit 72. Current command $I_1$ is multiplied by the commutation signal derived from pole sensor 102a, which senses the rotor axis position about its spin axis in electrical degrees. The pole sensor is described below regarding FIG. 19. Current sensor 103a, such as a precision series resistor, measures current passing to and from the associated phase of motor/generator 12. The output of multiplier 100 is a sinusoidal signal whose frequency and phase angle are those of the back electromotive force provided by sensor 102a and whose amplitude is proportional to the output of summing circuit 72. The signal from sensor 103a is subtracted from the output of multiplier 100 in summing circuit 104. After submission to compensating circuit 106, the signal is provided to comparator circuit 108 along with a high-frequency signal from sawtooth generator 110. The output of comparator 108 is either zero or a predetermined positive level. If it is a positive level, then a semiconductor switch such as a field-effect transistor 112, with protector diode 113, is closed to direct the current $I_{M/G}$ through FET 112 and then through line 114 back into the monitored phase of motor/generator 32. If the output of comparator 108 is zero, then FET 116, having protector diode 117, is closed and the current is delivered along line 114 to ground.

Figure 5:
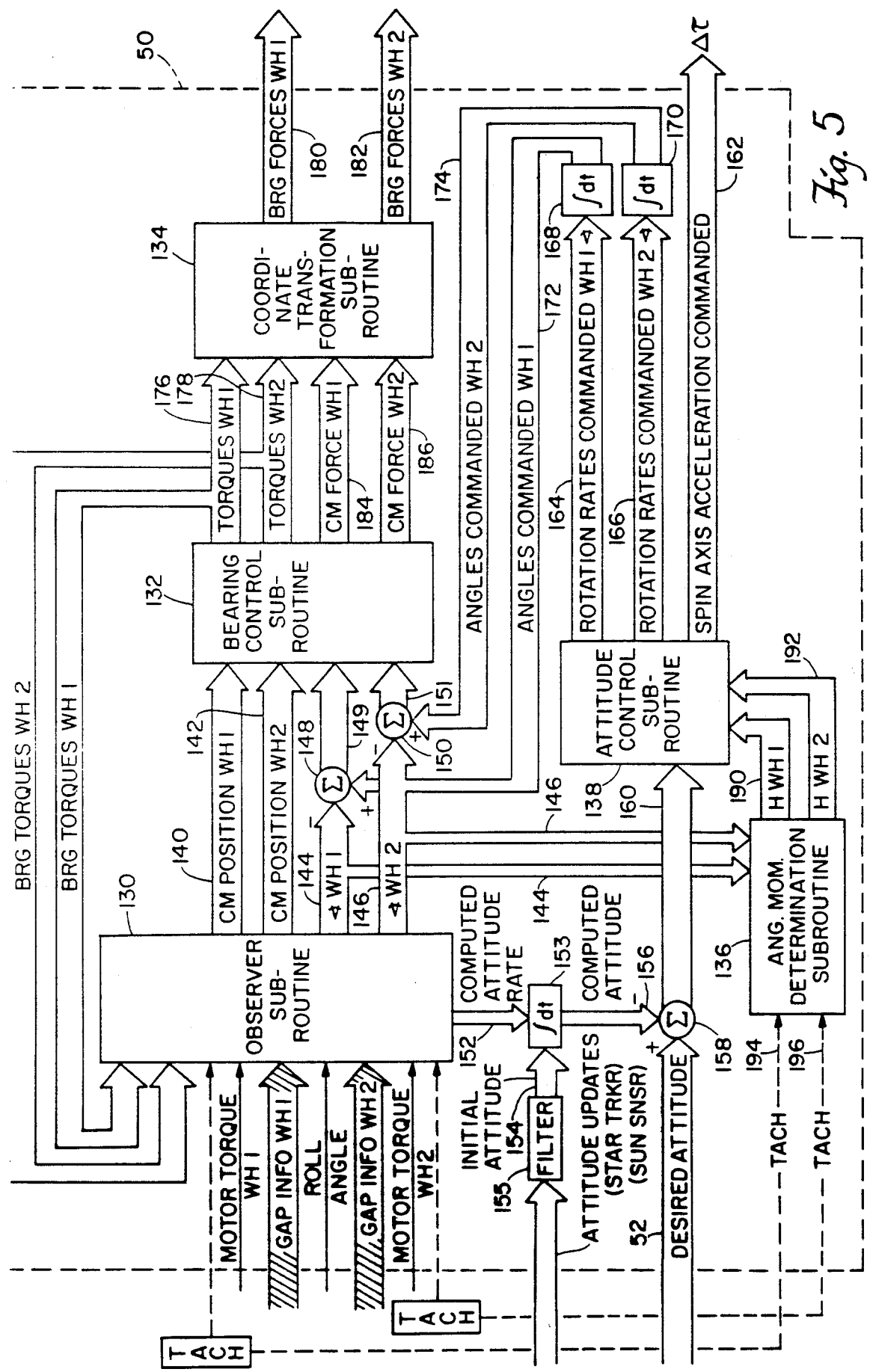
FIG. 5 is a block diagram of the attitude control and attitude reference of FIG. 2.

Computer 50 is operated by software, illustrated in FIG. 5 as having a number of subroutines: observer 130; bearing control 122; coordinate transformation 134; angular momentum determination 136; and attitude control 138. Observer subroutine 130 receives information from both tachometers as well as current measurements indicating the motor torques on each of the flywheels, the gap information from each of the flywheels, and the roll angle. From this, observer 130 calculates the center of mass position 140, 142 for each flywheel and the angular orientation 144, 146 of each of the flywheels. Signals 144, 146 are submitted to summing circuits 148 and 150, which in turn produce signals 149, 151 representing flywheel angle error. Observer 130 also provides computed attitude rate 152, which is submitted to integrator circuit 153 along with an initial attitude signal 154, such as is available through filter 155 from star tracking, sun sensors, or the like. Computed attitude 156, providing reference about the pitch, yaw and roll axes, is delivered to summing circuit 158, where it is combined with desired attitude 52. Attitude control subroutine 138 operates on error attitude 160 along with the angular momentum 190, 192 of each wheel as calculated by the angular momentum determination subroutine 136 from the tachometer inputs 194, 196 and the angular orientation 144, 146 of the wheels. Subroutine 138 provides the spin axis acceleration commanded, signal 162, and the rotation rates commanded, 164 and 166, for each of the two flywheels. The rotation rate commanded for each flywheel commands any required tipping of its spin axis, that is, a required rate of change in flywheel orientation relative to its bearings. Signal 162 is provided to power conditioning circuit 42, FIGS. 2 and 3. Signals 164, 166 are integrated at 168 and 170 and then submitted as angles commanded 172 and 174 for the two wheels to the other inputs of summing circuits 148 and 150. The error signals are then fed directly into bearing control 132, which generates commanding torques 176 and 178 on each of the flywheels. Commanding torques 176, 178 are directed back to observer 130 as bearing torques and also forward to coordinate transformation subroutine 134. That routine simply calculates bearing forces 180, 182 required on each wheel to produce center of mass forces 184, 186 and commanding torques 176 and 178 based on the distance of the spacing along the spin axis of the magnetic bearings.

Figure 6:
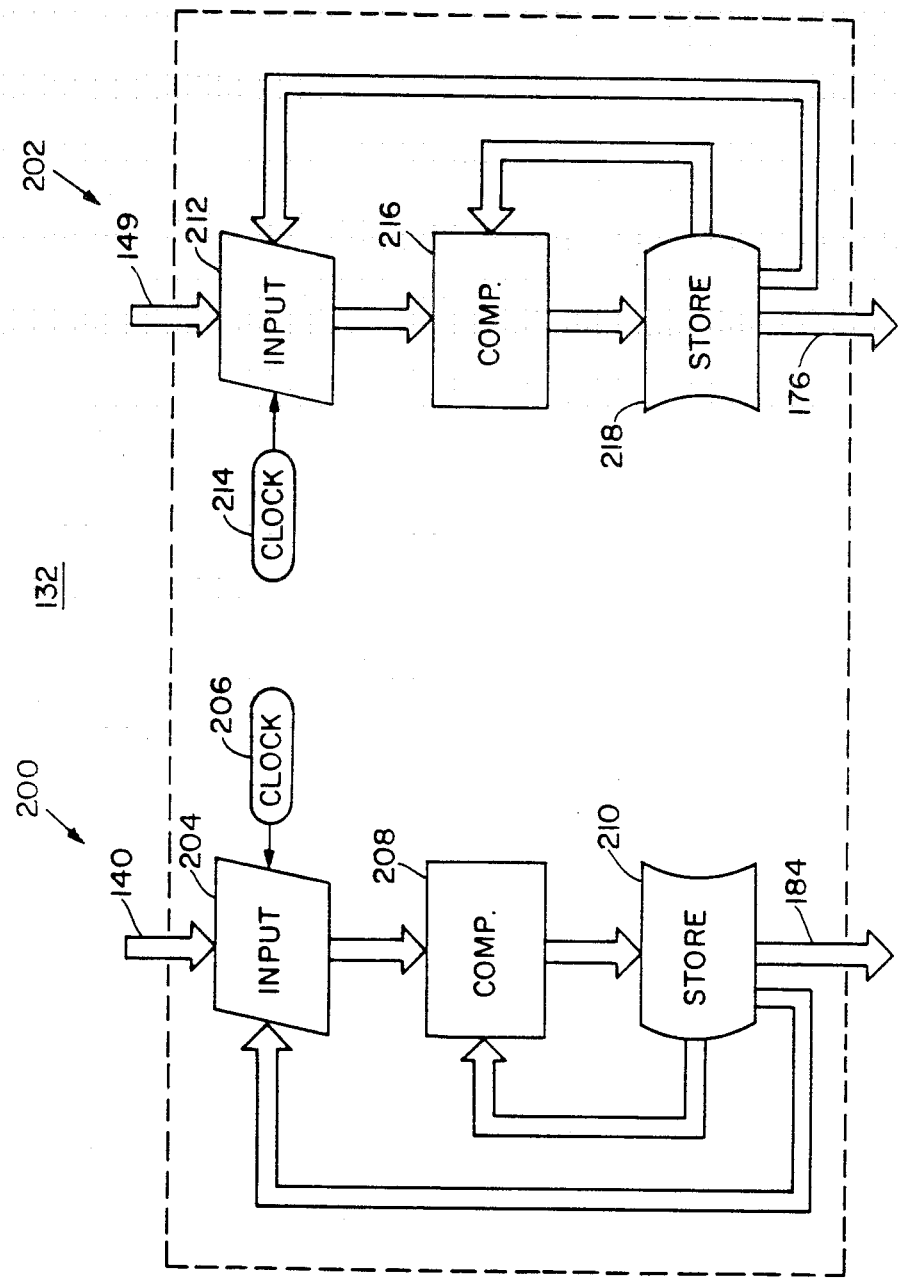
FIG. 6 is a more detailed block diagram of the bearing control subroutine of FIG. 5.

The bearing control subroutine 132 is shown in more detail in FIG. 6 with respect to one of the flywheels, nominally flywheel 20. Bearing control routine 132 includes two algorithms, one for wheel force command generation 200 and one for wheel torque command generation 202. In algorithm 200, the center of mass error 140 is input which is read at step 204 at a time determined by clock 206. The error signal is then fed to a recursive digital compensation network 208, which generates the compensation output, stores it in step 210, and provides it as the wheel 20 force command at 184. The same command is returned and stored in readiness for the next calculation and the logic returns to input step 204.

Similarly, algorithm 202 receives the flywheel 20 angle error 149 at input step 212, where it is clocked through with clock signal 214 to a similar recursive digital compensation network 216. The new wheel 20 torque command is then stored and provided at output 176.

Figure 7:
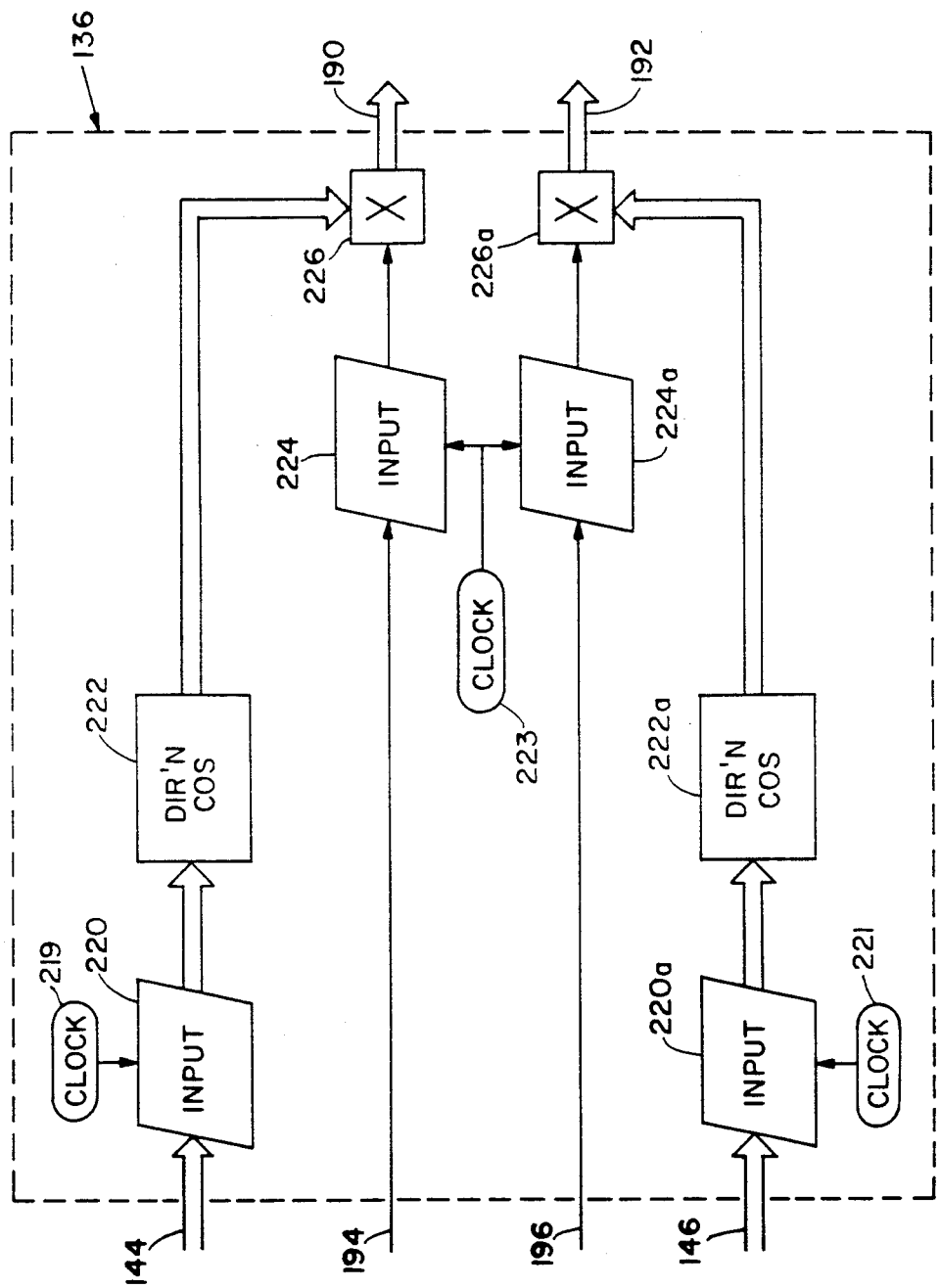
FIG. 7 is a more detailed block diagram of the angular momentum computation subroutine of FIG. 5.

Angular momentum determination subroutine 136 is shown in more detail in FIG. 7, where it receives the wheel 20 angles at 144 and the wheel 20 speed at 194. The wheel angle information is clocked by signal 219 into input 220 and then to step 222, where the direction cosine matrix is calculated. The output from calculation 222 and the speed 194 at step 224 are multiplied together at step 226 to provide the angular momentum 190 of wheel 20. The angular momentum of wheel 22 is similarly calculated from its speed 196 and angle 146 at rates determined by clock signals 221, 223.

Figure 8:
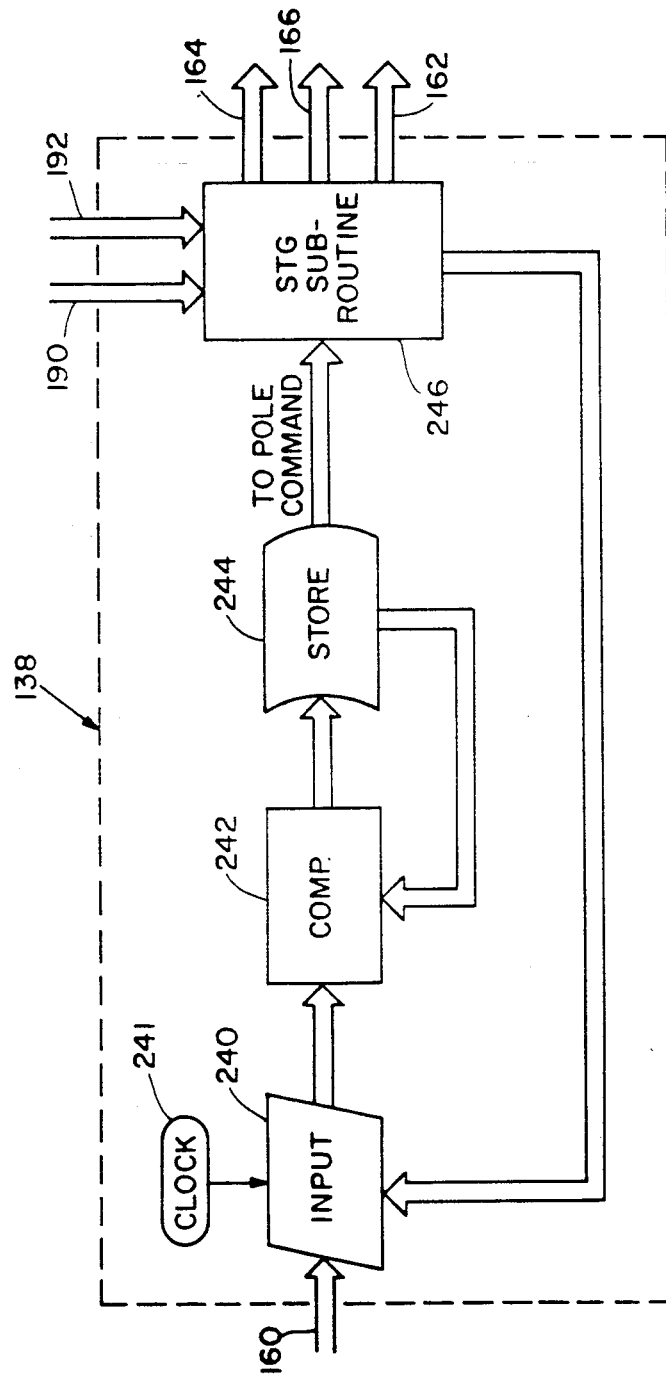
FIG. 8 is a block diagram of the attitude control laws subroutine of FIG. 5.

Attitude control subroutine 138 is shown in more detail in FIG. 8. The attitude error is submitted as an input, step 240, and from there at clock rate 241 to a recursive digital compensation network 242 which calculates the torque command, stores it in step 244 and delivers it to steering subroutine 246. The steering algorithm simply determines how the torque command is divided for application to the two flywheels 20, 22. The output from steering subroutine 246 provides the spin axis acceleration commands $\Delta \tau 162$ and the rotation rate commands 164, 166. When the torque command is provided at the output of store 244, the logic returns to step 240. The torque command itself is fed back to recursive digital compensation network 242 for use in subsequent cycles of compensation.

Figure 9:
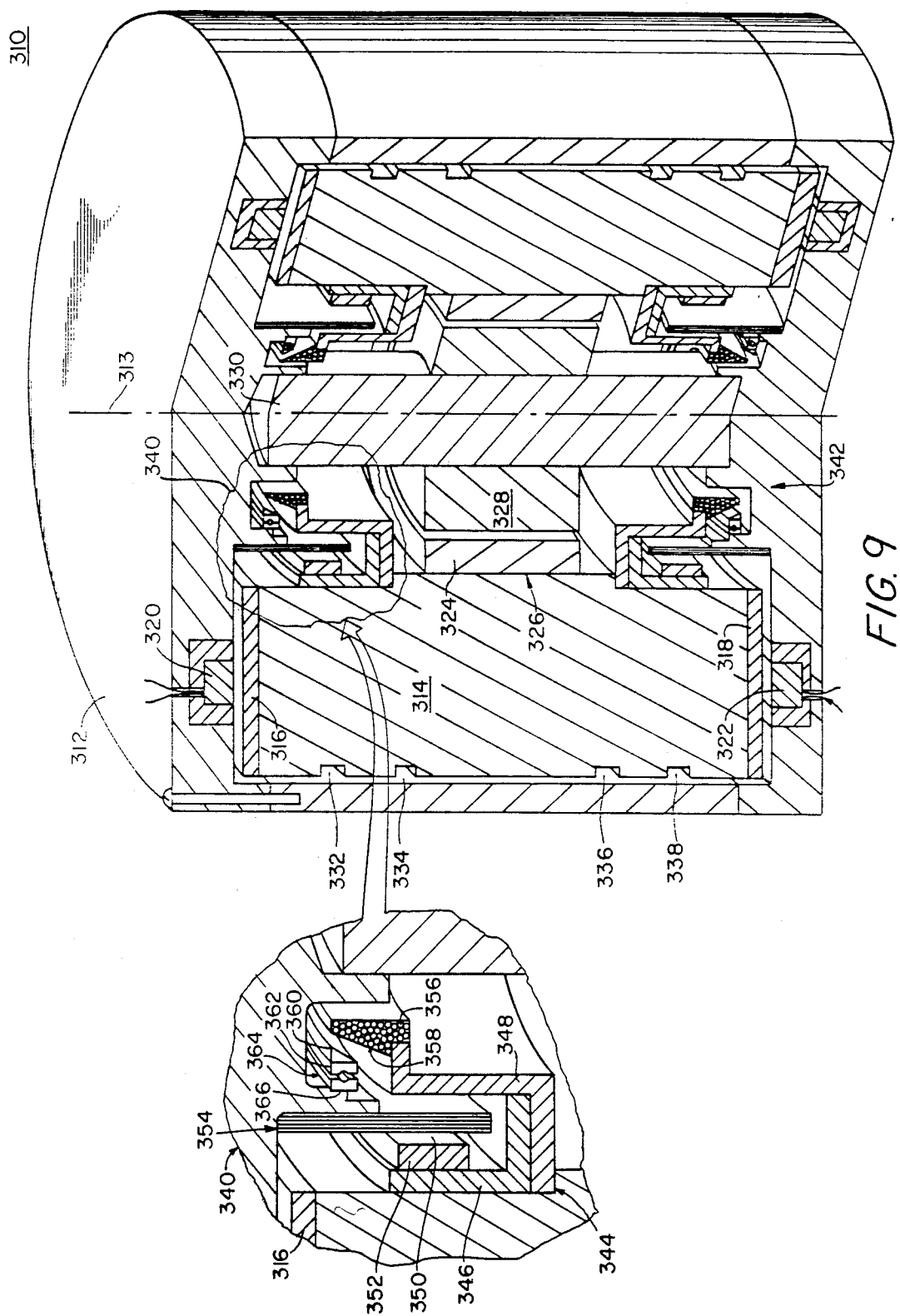
FIG. 9 is a cutaway axonometric view showing a section through a flywheel system with an enlarged view of one of the magnetic bearings.
Figure 15:
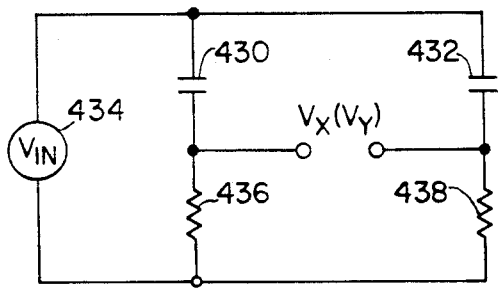
FIG. 15 is a schematic of a bridge circuit which produces a voltage signal representative of the radial displacement of the rotor for the sensor of FIG. 14.
Figure 16:
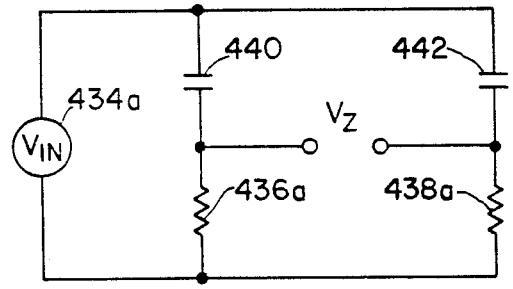
FIG. 16 is a schematic of the bridge circuit which produces a voltage representative of the axial position of the rotor relative to the housing for the sensor of FIG. 14.

There is shown in FIG. 9 a flywheel system 310 which includes a housing 312 in which is rotatable about axis 313 a non-magnetic flywheel 314. At either end of flywheel 314 there are magnetic plates 316 and 318 which interact with electrically controlled annular locking magnets 320, 322 for securing the flywheel rotor 314 when the system is subjected to large vibrations or shock loads. Flywheel 314 is attached to the rotor 324 of motor 326, which also includes stator portion 328 mounted on stationary center shaft 330. Grooves 332, 334, 336, and 338 cooperate with printed circuit material to form a position sensor, which is explained more fully in FIGS. 14, 15 and 16. System 310 includes two magnetic bearings 340, 342, one of which, 340, is shown enlarged. Each bearing 340, 342 includes a support member, channel 344, formed of magnetic material in two parts: magnet housing 346 and center pole 348. Channel 344 is mounted for rotation with rotor 314. There is a gap 350 in channel 344 in which is located magnet 352, and control coil structure 354, which is attached to the housing 312. Magnet 352 may be an electromagnet or a permanent magnet of the rare earth cobalt type; for example, it may be made of a Samarium cobalt material. Coupled to center pole 348 is a hardened member 356 with a slanted surface 358 that receives the wedge-shaped mounting 360 of inner race 362 of ball bearing 364 if the magnetic bearing system fails. In that event, channel 344 moves upward in the enlarged view until bearing surface 358 firmly engages the surface of wedge 360, and then the inner race 362 and outer race 366 of ball bearing 364 assume the bearing function for the system. Depending upon the mode of failure, either ball bearing 364 in magnetic bearing 340 or the counterpart ball bearing in magnetic bearing 342 assumes the load.

Figure 10:
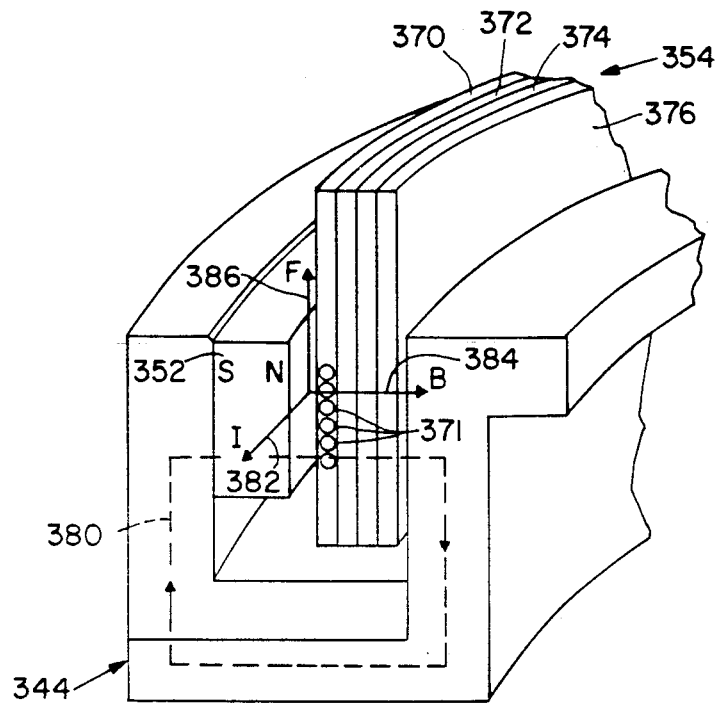
FIG. 10 is an enlarged schematic view of one of the bearings showing the generation of the axial suspension Lorentz force.

Coil structure 354, FIG. 10, includes three coils 370, 372 and 374. Coil 370 is the axial suspension coil, while coils 372 and 374 are the X and Y radial suspension coils. The coils are laminated together and mounted to a support cylinder 376 formed of a thin Macor shell. The current, I, flowing in the conductors 371 of axial suspension coil 370 flows in the direction indicated by arrow 382. Since the magnetic field, B, is in the direction indicated by arrow 384, the resulting Lorentz force is in the direction indicated by F, as shown at arrow 386. That force is equal to $$\vec{F}_R = nI\vec{l} \times \vec{B}$$

Figure 11:
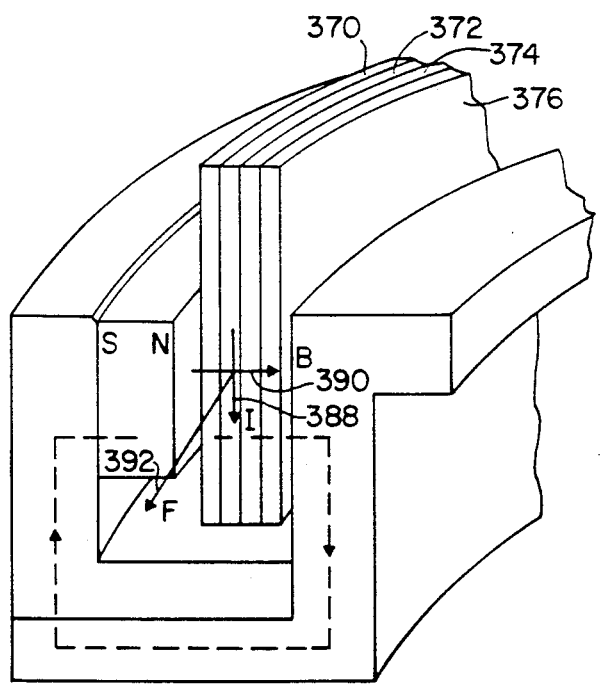
FIG. 11 is a view similar to FIG. 10 showing the generation of one of the radial suspension Lorentz forces.
Figure 12:
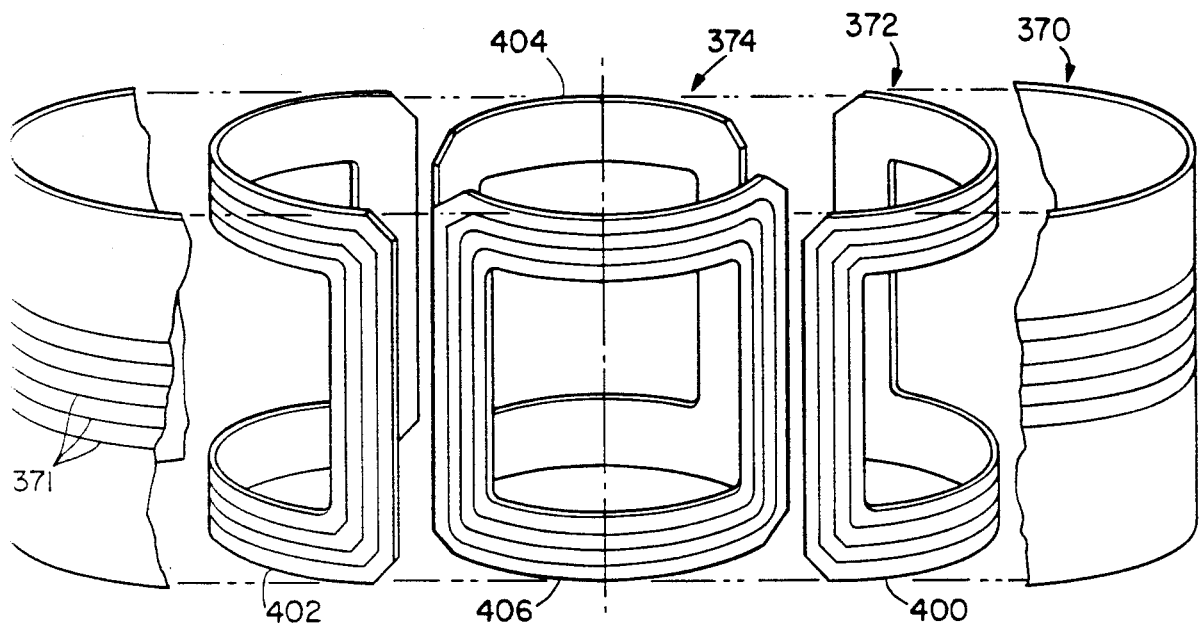
FIG. 12 is an exploded view of the control coils for the magnetic bearings of FIG. 9.
Figure 13:
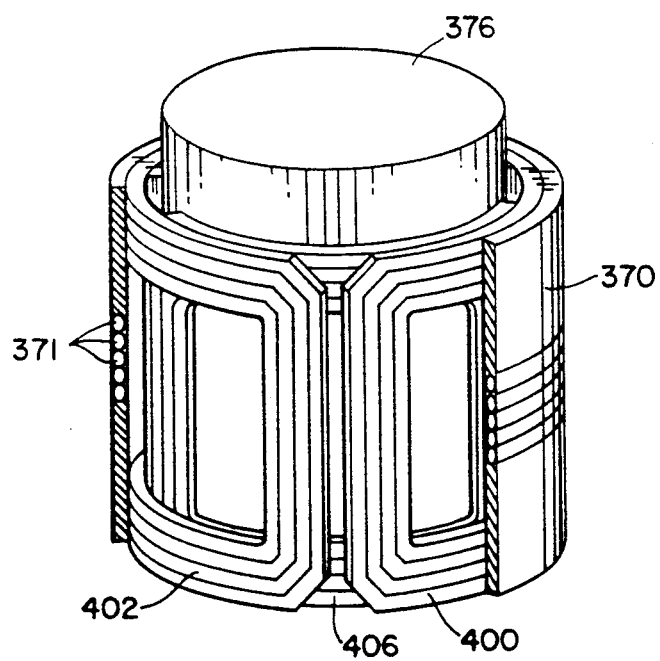
FIG. 13 is a cutaway portion of the control coils in their final assembled form.

In a similar manner, radial suspension coil 372 produces current I in the direction of arrow 388. With the magnetic field B in the direction shown by arrow 390, FIG. 11, Lorentz force F is in the direction indicated by arrow 392. The third coil, 374, will have the current I in the same direction as indicated by arrow 388 or in the opposite direction, depending upon which way the magnetic bearing is currently required to apply force. Coil 372 may be designated the X coil and coil 374 the Y coil. The physical construction of the three coils is shown more clearly in FIG. 12, where the X axis coil 372 includes two halves 400 and 402, and the Y axis coil 374 has halves 404 and 406. Surrounding all of those is the Z axis coil, or axial suspension coil, 370. The support structure is eliminated for clarity in FIG. 12 but is shown in FIG. 13, where it appears as a thin-walled cylinder made of Macor.

Figure 17:
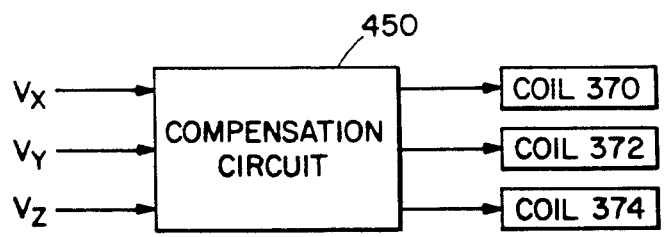
FIG. 17 is a block diagram of the circuit which responds to the voltages generated by FIGS. 15 and 16 to energize the control coils of FIGS. 12 and 13.

A sensor circuit for monitoring the axial position and the radial X, Y position of rotor 314 with respect to housing 312 is shown in FIG. 14. The sensor 120 is associated with grooves 332 and 334 and includes three printed circuit areas: common area 422, radial area 424, and axial area in two separate bands 426 and 428. Bands 426 and 428 and area 422 extend completely around the inside of the housing. Area 424 occurs at four positions equally spaced at 90° about the inner wall of the housing. This structure produces two electric fields, $A_1$, $A_2$, which aid in monitoring the axial motion of the rotor, and one electric field R, which serves to monitor the radial motion of the rotor. Through suitable connections, the electric field represented by R in FIG. 14 is schematically shown by capacitor 430 in FIG. 5. A similar capacitance is developed in a position diametrically opposed to the one shown, and is represented by capacitor 432. An excitation voltage provided by source 434, such as 100 volts RMS at 25 KHz, is provided to the bridge circuit consisting of capacitors 430, 432 and resistors 436 and 438, in the portions of the circuit external to system 310. Any radial motion of the rotor with respect to the housing causes an imbalance in the bridge, shown in FIG. 15, and produces a voltage $V_x$ or $V_y$ representative of the displacement. The circuit in FIG. 15 develops the $V_x$ signal in an identical circuit from the capacitors associated with area 424 and its diametrically opposed area. A similar circuit develops a $V_y$ displacement voltage with respect to the two other areas. The axial fields $A_1$, $A_2$, have associated with them capacitance which is represented by capacitors 440, 442, FIG. 16, which have a similar excitation voltage source 434a, and resistors 436a and 438a. The voltage produced here by bridge imbalance is $V_z$, the axial displacement voltage. The $V_z$, $V_x$, and $V_y$ voltages are provided to a compensation circuit 450, FIG. 17, whose output is delivered selectively to coils 370, 372 and 374 to keep the magnetic bearing system properly aligned.

Figure 18:
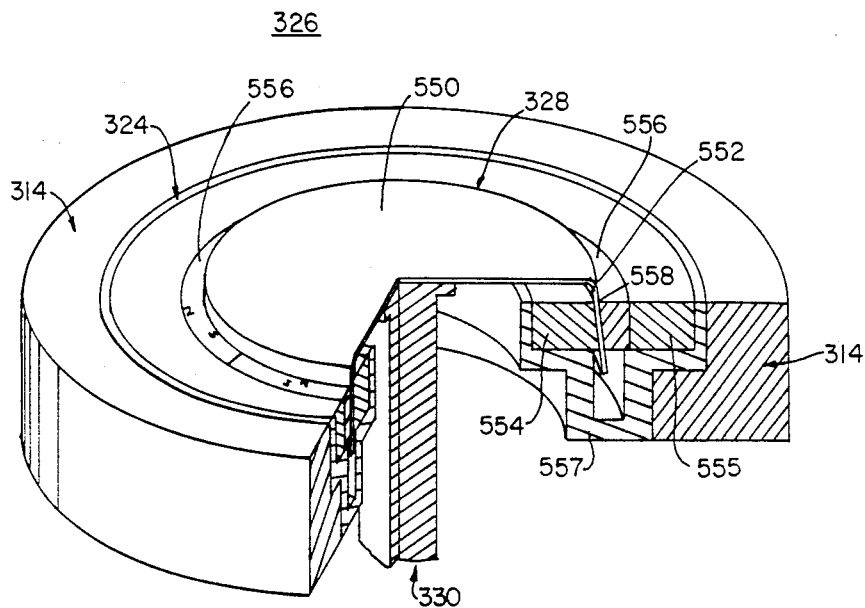
FIG. 18 is an enlarged axonometric partially broken-away sectional view of the motor/generator of FIG. 9.
Figure 19:
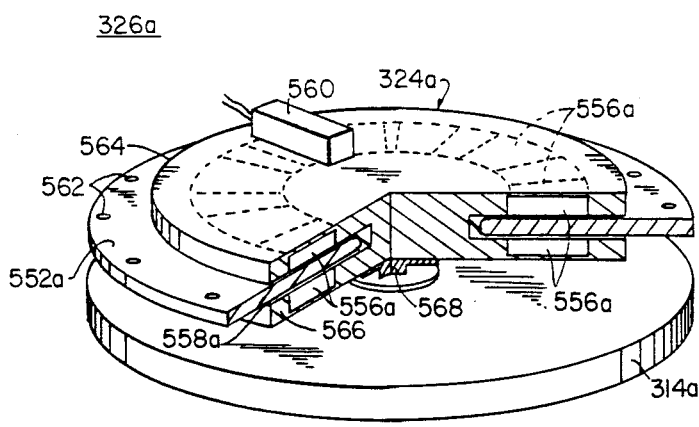
FIG. 19 is an axonometric view with portions broken away and in section of an alternative construction of a motor/generator.

Motor 326 is shown only schematically FIG. 9 as having two parts, a rotor 324 and stator 328. These parts are shown in more detail in FIG. 18, where it can be seen that stator 328 includes a plate 550 which supports motor/generator coils 552. Rotor 324 includes two cores of magnetic material 554, 555, such as vanadium permendur, mounted on non-magnetic support 557, of a material such as aluminum, and including a plurality of circumferentially spaced radially extending permanent magnets 556. A gap 558 in rotor 324 accommodates stator coils 552. Attached to the outside of rotor 324 is flywheel 314, which is formed from a combination of boron and aluminum which is 40-60% boron and 60-40% aluminum by volume. The boron is in the form of filaments whose average diameter is 0.006 inch (150 microns) and which are oriented circumferentially in the flywheel. Flywheel 314 and shaft 330 have been truncated flush with the top of rotor 324 for ease of illustration only: as can be seen from FIG. 9 both of these parts extend well above rotor 324. For purposes of developing a commutating signal to be used for switching the current flow to and from the motor/generator 326, a device may be used to detect the position of permanent magnets 556 as they rotate. For a three-phase motor/generator, this may be done with three photoelectric elements and indicia on rotor 324 or by means of three Hall effect devices, such as devices 560 shown in FIG. 19, which will directly detect the magnetic fields of the poles of magnets 556 to measure rotor angle about the spin axis in electrical degrees. Hall effect device 560 is shown in FIG. 19 in conjunction with an alternative embodiment of motor 326a, in which the stator coils are in the form of a disc 552a with holes 562 for mounting. Rotor 324a includes an upper and a lower portion 564 and 556 which are fixed on shaft 568 to rotate with disc-shaped flywheel 314a. Stator windings 552a are received in gap 558a of rotor 324a. There are magnets 556a in both the upper and lower portions 564, 556 of rotor 324a.

Figure 20:
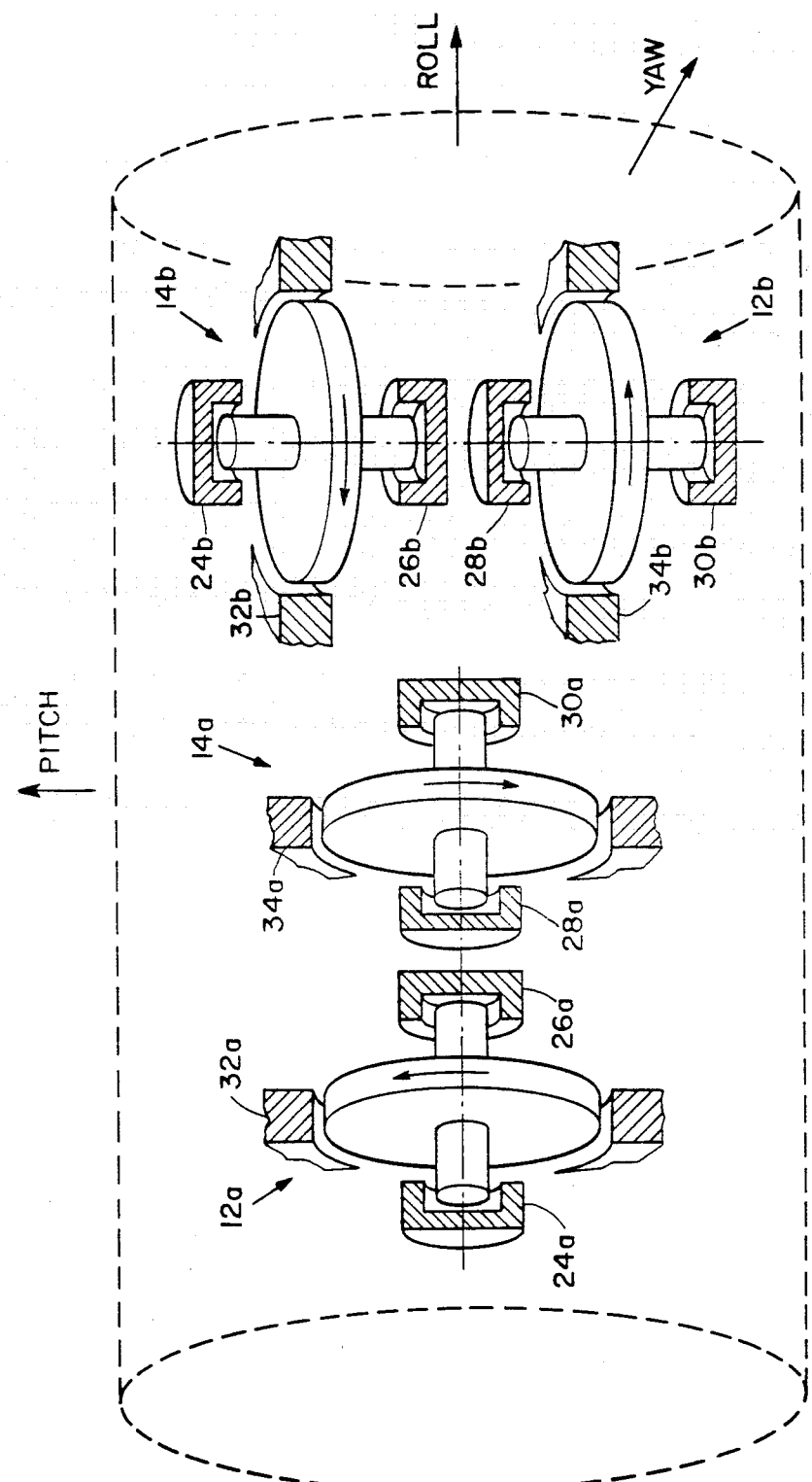
FIG. 20 is another embodiment of the present invention having two pairs of flywheel systems.

Although thus far the system according to this invention is shown utilizing only a two-flywheel implementation combined with a single degree of freedom gyro, this is not a necessary limitation of the invention. As shown in FIG. 20, two pairs of flywheel systems can be used to provide control and attitude reference in all three axes without the use of a single degree of freedom gyro while increasing the energy storage capacity of the system. In this construction the flywheels function as control moment gyros regarding attitude control, rather than as reaction wheels. The first set of flywheel systems 12a, 14a are typically aligned with their spin axis on the roll axis of the satellite, while the second set of flywheel systems 12b and 14b are arranged with their spin axis either along the yaw or pitch axis. Shown also are bearings 24a, 26a, 28a, 30a and 24b, 26b, 28b and 30b, as well as motor/generators 32a, 34a, 32b, and 34b.

The spin axis, or nominal spin axis, of each pair may be mutually perpendicular as shown in FIG. 20. However, the spin axes need not be mutually perpendicular as long as all the angular momenta can be balanced at nominal alignment to produce zero net angular momentum within the system. For convenience of angular momentum control, it is desirable that the inertia is the same such that zero net angular momentum is achieved when the flywheels within a given pair are at the same spin rate and the flywheels are centered within their bearings. Torques are applied to the flywheels through the bearings, preferably magnetic bearings, to control attitude of the craft about all three axes: pitch, yaw and roll. The motor/generators are regulated so as not to interfere with attitude control on the craft while the motor/ generators store and transfer energy. This is accomplished by maintaining at zero the net torque exerted by the motor/ generators on the craft.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An energy storage, attitude control and reference system for a craft comprising:
   at least two flywheels with their angular momenta balanced to produce zero net angular momentum;
   at least two motor/generator units each including one of said flywheels in its rotor structure;
   a pair of bearings for supporting each of said flywheels;
   means for measuring the position of each said flywheel relative to its bearings;
   means, responsive to said means for measuring, for determining attitude reference about at least two mutually perpendicular axes of the craft;
   means for resolving current to and from said motor/generator units;
   means for applying torques to each said flywheel through its respective bearings for controlling attitude of the craft about said two mutually perpendicular axes; and
   means for exerting torques on each said flywheel through its respective motor/generator to provide attitude control of the craft about a third axis perpendicular to the first two and for controlling the energy storage level of said flywheels.

2. The system of claim 1 in which the means for measuring indicates the orientation of each flywheel and includes a tachometer which indicates spin rate of each flywheel.

3. The system of claim 2 in which the means for applying torques determines angular momentum of each flywheel from the spin rate and orientation indications.

4. The system of claim 3 in which the means for applying torques matches desired attitude with actual attitude to resolve attitude error and utilizes attitude error and angular momentum to command a change in flywheel orientation relative to the bearings.

5. The system of claim 4 in which the utilization of the attitude error and angular momentum is integrated over time.

6. The system of claim 4 in which the means for applying torques utilizes attitude error and angular momentum to command spin rate acceleration for each flywheel.

7. The system of claim 6 in which the means for exerting torques includes a power conditioning circuit which drives the motor/generator in response to the acceleration command.

8. The system of claim 7 in which the power conditioning circuit includes:
   a pulse width modulated bidirectional inverter interconnecting the motor/genertor with a power supply bus;
   a summing circuit for determining differences between a reference voltage and the voltage on the power supply bus; and
   a pulse width modulator switch control responsive to said summing circuit, to the means for measuring, and to the means for resolving, for actuating said inverter to increase pulse width as a function of increase in the difference between the reference voltage and the voltage in the bus and to increase current to the motor/generator in the motor direction when the bus voltage exceeds the reference voltage and to increase current from the motor/generator in the generator direction when the reference voltage exceeds the bus voltage.

9. The system of claim 1 in which the means for resolving includes, for each motor/generator unit, a pole sensor which develops a commutating signal for switching current flow to and from the motor/generator unit.

10. The system of claim 1 in which the means for measuring includes a capacitive sensor.

11. The system of claim 10 in which each motor/generator unit includes a housing and in which the capacitive sensor includes, on the housing, printed circuit areas which produce an electric field that is affected by motion of the rotor.

12. The system of claim 11 in which the capacitive sensor produces two electric fields which aid in monitoring axial motion of the rotor and one electric field which serves to monitor radial motion of the rotor.

13. The system of claim 1 in which the means for determining provides attitude reference about the pitch and yaw axes of the craft.

14. The system of claim 1 further including a single degree of freedom gyroscope which senses rotation of the craft about an axis.

15. The system of claim 14 in which the gyroscope provides attitude reference about the roll axis of the craft.

16. The system of claim 1 in which the bearings are magnetic bearings.

17. The system of claim 1 in which the flywheels produce zero net angular momentum at the same spin rate.

18. The system of claim 1 in which the motor/generators have three phases and the means for resolving resolves current in each phase.

19. An energy storage, attitude control and reference system for a craft comprising:
- at least two pairs of flywheels with the angular momenta of each pair balanced to produce zero net angular momentum;
- at least four motor/generator units each including one of said flywheels in its rotor structure;
- a pair of bearings for supporting each of said flywheels;
- means for measuring the position of each said flywheel relative to its bearings;
- means, responsive to said means for measuring, for determining attitude reference about three mutually perpendicular axes of the craft;
- means for resolving current to and from said motor/generator units;
- means for applying torques to each said flywheel through its respective bearings for controlling attitude of the craft about said three mutually perpendicular axes; and
- means for maintaining at zero the net torque exerted by the motor/generators on the craft and for controlling the energy storage level of said flywheels.

20. The system of claim 19 in which the means for measuring indicates the orientation of each flywheel and includes a tachometer which indicates spin rate of each flywheel.

21. The system of claim 20 in which the means for applying torques determines angular momentum of each flywheel from the spin rate and orientation indications.

22. The system of claim 21 in which the means for applying torques matches desired attitude with actual attitude to resolve attitude error and utilizes attitude error and angular momentum to command a change in flywheel orientation relative to the bearings.

23. The system of claim 22 in which the utilization of the attitude error and angular momentum is integrated over time.

24. The system of claim 22 in which the means for applying torques utilizes attitude error and angular momentum to command spin rate acceleration for each flywheel.

25. The system of claim 24 in which the means for maintaining includes a power conditioning circuit which drives the motor/generator in response to the acceleration command.

26. The system of claim 25 in which the power conditioning circuit includes:
- a pulse width modulated bidirectional inverter interconnecting the motor/genertor with a power supply bus;
- a summing circuit for determining differences between a reference voltage and the voltage on the power supply bus; and
- a pulse width modulator switch control responsive to said summing circuit, to the means for measuring, and to the means for resolving, for actuating said inverter to increase pulse width as a function of increase in the difference between the reference voltage and the voltage in the bus and to increase current to the motor/generator in the motor direction when the bus voltage exceeds the reference voltage and to increase current from the motor/generator in the generator direction when the reference voltage exceeds the bus voltage.

27. The system of claim 19 in which the means for measuring includes, for each motor/generator unit, a pole sensor which develops a commutating signal for switching current flow to and from the motor/generator unit.

28. The system of claim 19 in which the means for measuring includes a capacitive sensor.

29. The system of claim 19 in which the bearings are magnetic bearings.

30. The system of claim 19 in which the flywheels produce zero net angular momentum at the same spin rate.

31. The system of claim 19 in which the net spin axes of the flywheel pairs are mutually perpendicular.

32. The system of claim 19 in which the system provides reference about the pitch, yaw, and roll axes.

33. An energy storage, attitude control and reference system for a craft comprising:
- at least two flywheels with their angular momenta balanced to produce zero net angular momentum;
- at least two motor/generator units each including one of said flywheels in its rotor structure;
- a pair of bearings for supporting each of said flywheels;
- means for measuring the position of each said flywheel relative to its bearings;
- means, responsive to said means for measuring, for determining attitude reference about two mutually perpendicular axes of the craft;
- means for resolving current to and from said motor/generator units;
- means, responsive to said means for determining, for applying torques to each said flywheel through its respective bearings for controlling attitude of the craft about said two mutually perpendicular axes;
- gyroscope means for sensing rotation of the craft about a third axis perpendicular to the first two; and
- means, responsive to said gyroscope means and said means for resolving current, for exerting torques on each said flywheel through its respective motor/generator to provide attitude control of the craft about said third axis and for controlling the energy storage level of said flywheels.

* * * * *